Jan. 30, 1934. H. B. DILKES 1,945,481

FILM HOLDING DEVICE

Original Filed Sept. 28, 1929   3 Sheets-Sheet 1

Inventor:—
Howard B. Dilkes
By John E. Gardner
atty.

Jan. 30, 1934.   H. B. DILKES   1,945,481
FILM HOLDING DEVICE
Original Filed Sept. 28, 1929   3 Sheets-Sheet 2

Inventor:—
Howard B. Dilkes.
By John E. Gardner
Atty.

Jan. 30, 1934.                H. B. DILKES                 1,945,481
                            FILM HOLDING DEVICE
                    Original Filed Sept. 28, 1929    3 Sheets-Sheet 3

Inventor
Howard B. Dilkes
By John E. Gardner.
Atty.

Patented Jan. 30, 1934

1,945,481

UNITED STATES PATENT OFFICE 1,945,481

FILM HOLDING DEVICE

Howard B. Dilkes, Wilmette, Ill.

Application September 28, 1929, Serial No. 395,874
Renewed July 21, 1933

4 Claims. (Cl. 248—39)

The present invention relates in general to photographic film holding devices.

One of the objects of the present invention is to provide an improved holding device for photographic film, constructed so as to maintain the film in a perfect plane.

Another object is to provide an improved holding device for photographic film so that the film may be employed instead of glass plates heretofore necessary in a great many instances where the accuracy of work is required.

Another object is to provide an improved film holding device, which will maintain the film in a perfect plane, irrespective of its inherent tendency to curl.

Another object is to provide an improved film holding device employing air pressure to hold the film flat.

A further object is to provide an air pressure holding device which will be effective to hold films of any and all sizes so the films may be substituted for glass plates in work requiring a high degree of accuracy and a nicety of results.

A still further object is to employ air pressure in holding devices of various kinds in photographic work such as printing frames and copy holding devices so that excellent results may be obtained.

Still another object is to provide a photographic holding device which may be adopted to handle the various standard sizes of film and copy work by controlling the area over which the air pressure is applied.

A still further object is to provide a printing frame which does not require the use of a glass over the film and paper to hold it in position, thereby providing an arrangement whereby the maximum photographic exposure may be obtained from the printing light employed.

There are other objects of my invention which, together with the foregoing, will be described in the detailed specification which is to follow, taken in conjunction with the accompanying drawings forming a part thereof.

In practicing my invention, I provide in one of its applications, a film holding frame comprising two flat sheets of metal, suitably spaced apart, and connected together to form a hollow receptacle, and adequately braced or supported at suitable points; one face of this receptacle has a plurality of small openings leading into the interior of the receptacle and equally spaced apart. A vacuum outlet is provided, by which connection may be made with any ordinary vacuum pump. The operation of the vacuum pump serves to reduce the air pressure within the hollow receptacle and causes air to be forced through the small openings in the face. When a film is laid over the face of the device, it is immediately forced into a flat plane by the air pressure and firmly held in this position.

Referring now to the drawings comprising Figures 1 to 6, inclusive:

Figures 1, 2:
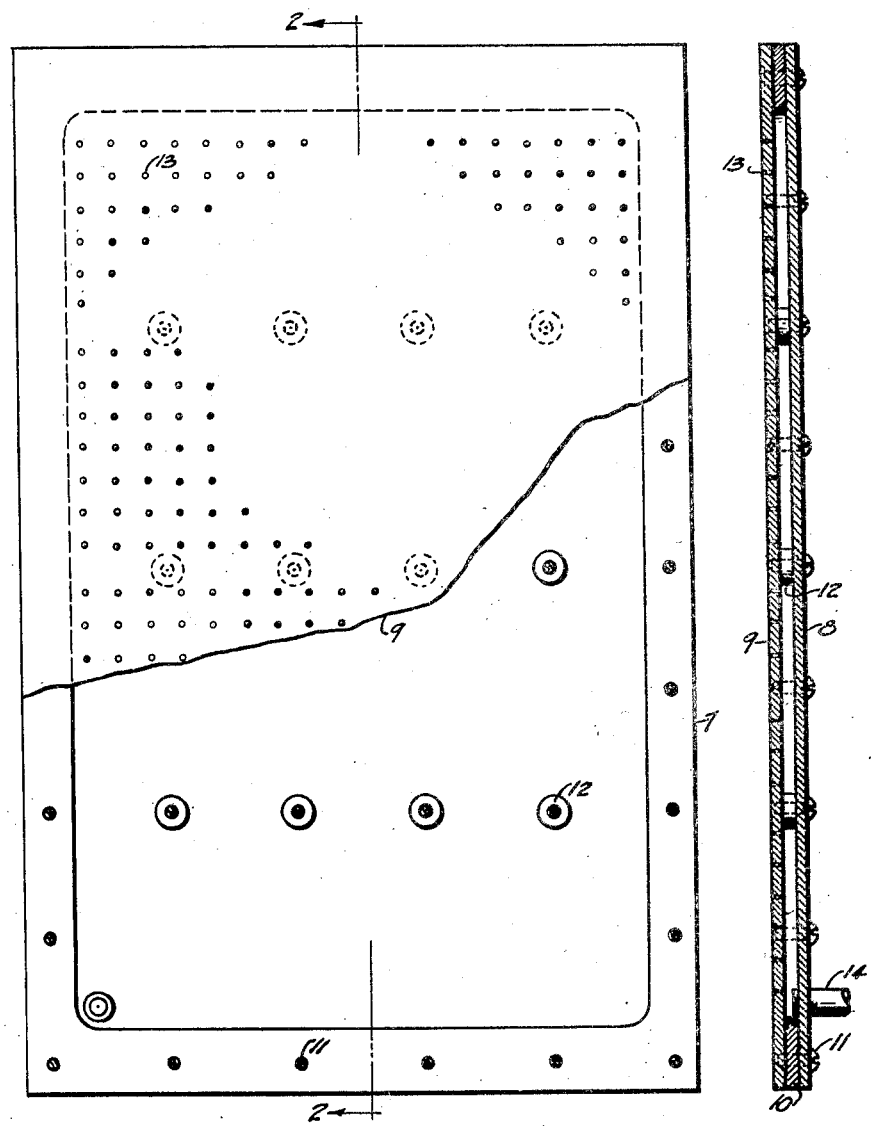
Fig. 1 is a front plan view of my improved film holding device with part of the face broken away to illustrate its construction.
Fig. 2 is a medial cross-section of the same, taken along the line 2—2 of Fig. 1, looking in the direction of the arrows.

In the drawings like reference characters refer to similar parts throughout. Referring now to Figs. 1 and 2 in particular, I shall first describe the application of my inveniton to a simple film holding device that may be employed in any usual plate holding camera, whereby the same or better results may be secured by the use of film as with a plate.

The reference character, 7, designates a hollow container formed from two metallic plates, 8 and 9, suitably spaced apart by flat metal strips, 10, around their periphery and held together by bolts or screws, 11. The bolts, 11, are suitably distributed about the face of the rear plate, 8, through which they penetrate, and are threaded into openings in the plate, 9. Circular spacing members, 12, extend around each bolt of sufficient thickness to furnish support to the plates, 8 and 9. The bolts, 11, around the periphery of rectangular shaped plates, 8 and 9, together with the metal strips, 10, form an air tight joint. The face plate, 9, is usually finished by grinding or otherwise, to form a perfectly plane surface. A plurality of small openings, 13, equally spaced apart are drilled in the face plate, 9, in the form of a rectangle of suitable size to fit any film with which the frame is adapted to be employed. I prefer to make these holes form a rectangle slightly smaller in size than the size of the film it is adapted to hold. I have found the best practice is to leave about one-half (½) inch of the film projecting beyond the line of the holes. An inlet pipe, 14, is suitably threaded through an opening in the back plate, 8, to furnish a connection to which the vacuum pump may be attached. I prefer to make the face plate, 9, of cold rolled steel, and the back plate, 8, of aluminum or brass. Obviously, other suitable materials may be employed. The film holder, 7, resembles a photographic plate and is similar in size so as to fit in the usual plate holders employed in photographic cameras.

In operation, the vacuum pump is connected to the outlet, 14, and a film is suitably positioned on the face, 9, where it is held by air pressure. The holder, 7, is then placed in the usual plate holder of the camera and adjusted in the same manner as a plate. The pressure of the air on the face of the film serves to flatten it out and hold it in a perfect plane overcoming any tendency of the film to curl or bulge at any point. This is particularly true when it is considered that openings in the face plate, 9, are quite small and relatively close together. The film is then held firmly in place on the film holder, it being impossible to pull it off by a direct pull. By lifting one edge, it may readily be removed. This follows from the fact that as soon as one edge of the film is lifted, the air pressure upon a few holes around the edge is immediately relieved, and this reduction in air pressure is distributed over the interior of the film holder permitting the film to be withdrawn quite readily. It has been impossible heretofore to employ a film for various kinds of photographic work, such as color photography, copy cameras and in photogravure work, as well as half-tones, for the reason that a high degree of nicety is required, and any variation in the face of the film from perfect plane leads to irregularities in the work, and also to indistinct or accentuated photographic reproductions of parts of the image. Consequently, it has been necessary to employ glass plates with all the attendant dangers of working and difficulties of handling, which are well known to those skilled in the art. By the use of my improved film holder, it is possible to obtain identically the same nicety of work with the film, as has heretofore been possible with glass plates, since my film holder will hold a film in a perfect plane. There are also advantages which come from the added facility of handling the film and the ability to secure better results in certain instances, by its use. The work of reproduction, using the films, instead of plates, is also a great deal cheaper, not only because of the elimination of the breakage factor, but because the first cost of film is considerable cheaper than that of glass plates.

Figure 3:
Fig. 3 is a side elevation of a spring clip that may be employed to hold the film prior to the time the vacuum pump is connected with the holding device of Fig. 1.

While the operation described hereinbefore is that of employing my film holder in a dark room camera, it will be appreciated that the film holder may be employed in outside cameras without deviating from the scope of my invention. In this instance, it is necessary to hold the film from the time it is placed on the film holder mechanically until air pressure is applied at the camera. This may be accomplished by employing a suitable clip, 15, Fig. 3. A clip, such as 15, is placed over the edge of the film holder at one or more of the corners, and the film holder is then carried to the outside connection made. As soon as the vacuum connection is made, the film is forced into close contact with the face, 9, and since it has a perfectly plane surface, the surface of the film will also lie in a perfect plane.

It will be appreciated that it is possible to employ a device similar to my improved film holder for a printing frame, thereby eliminating the difficulty of handling the film, which has a tendency to curl upon developing, and also doing away with the use of glass. In this application, printing paper is first placed upon the face plate, 9, in the same manner as before described, and the film is laid over it. The printing paper is cut somewhat smaller than the film so that the part of the film which projects over the edge of the paper will be held by the air pressure. A mask may be employed if further contact is needed, and in fact, it is possible to lay a piece of glass right over the face of the film and hold it in place by the pressure of the air, provided the printing frame is made sufficiently large to accommodate more opening in the form of a rectangle of considerable larger size than the film. However, ordinarily it will be found that the application of air pressure to the edges of the film will serve to hold it in a perfect plane and enable the printing to be done without the use of a glass plate or mask. This elimination of a glass plate in the printing operation is exceedingly valuable, since it permits the light employed for printing to have a greater photographic value by reason of being applied direct to the film without the interposition of glass, which cuts off a great many of the light rays, or modifies them. Consequently, the use of printing frame of this character gives better results and increased speed to the usual type of printing frame heretofore employed. Another advantage of the use of a printing frame of this character is that some novel effects may be obtained by employing a translucent or transparent material to place over the surface of the film, such as silk, to obtain any softening or other effect desired.

Figure 4:
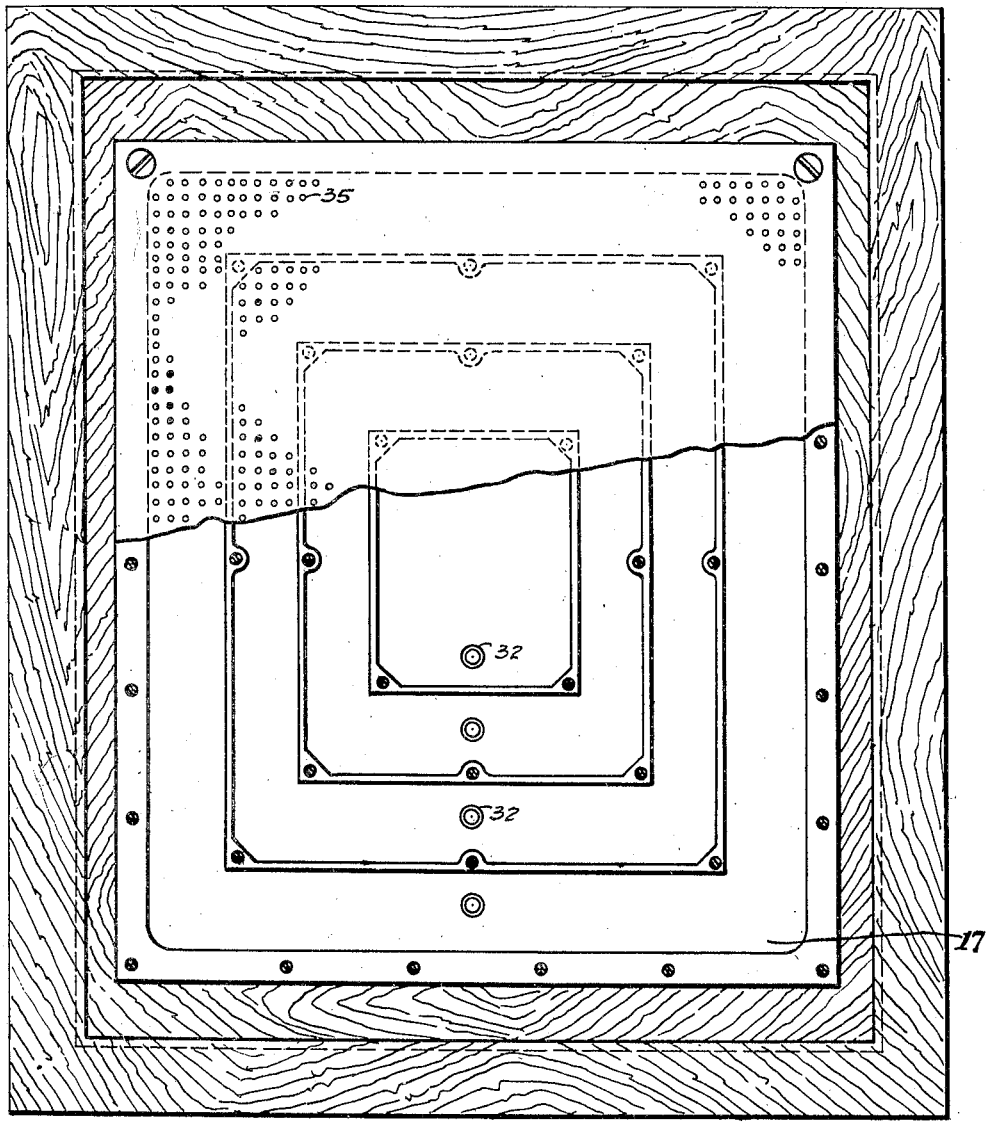
Fig. 4 is a plan view of the back of a copy camera illustrating a modified form of my improved holding device, as shown in Fig. 1 affixed thereto, with part of the face broken away to illustrate the construction.
Figure 5:
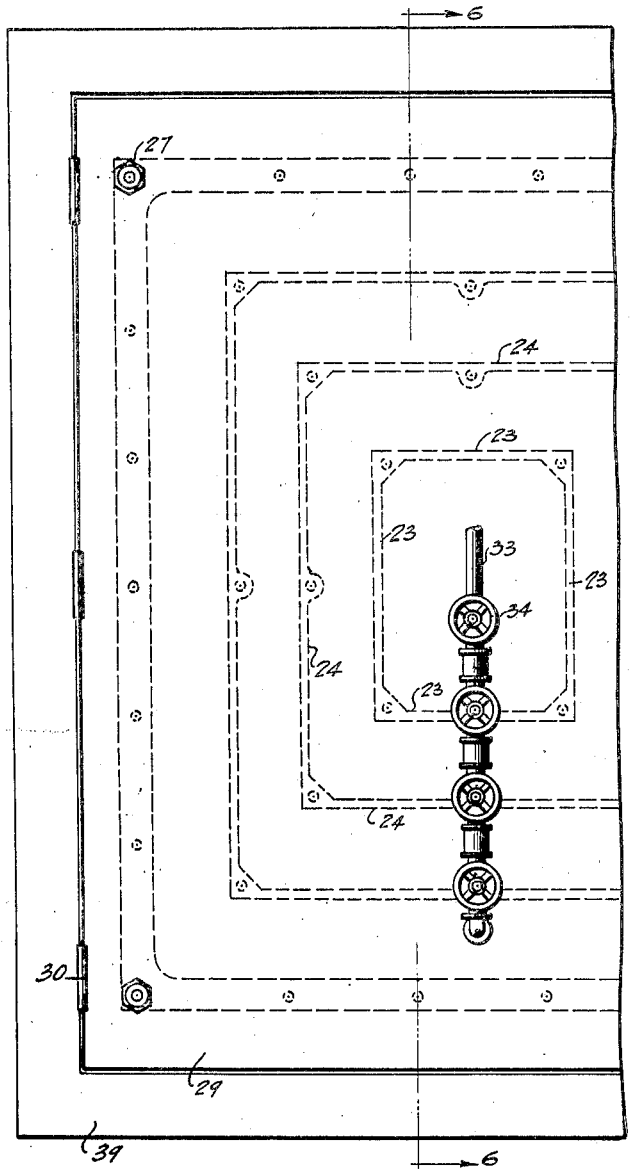
Fig. 5 is a similar view of a portion of the back of the camera with the vacuum connections in place.
Figure 6:
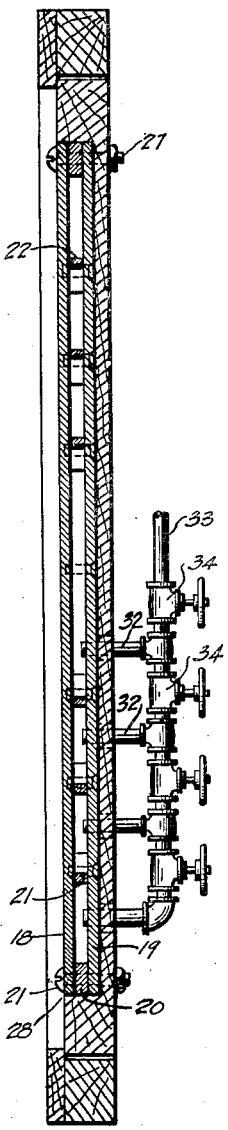
Fig. 6 is a medial section thereof along the line 6—6 of Fig. 5, looking in the direction of the arrows.

Referring now to Figs. 4 to 6, inclusive, I have shown a modification of my invention in which the film holder is made part of the camera. In this particular application, the film holder, 17, is of sufficient size to accommodate the largest film that the camera can employ. Essentially, the film holder comprises as before two metallic plates, 18 and 19, suitably spaced apart by metal strips, 20, about the periphery, and secured together by bolts, 21, in a manner similar to that already described. In order to furnish a support to prevent the hollow receptacle from collapsing, the back plate, 19, is provided with a plurality of ribs, 22, which may be formed integrally therewith. These ribs, 22, are equally spaced apart and extend in a direction parallel to the width of the film holder, 17. They bear against the face plate, 18, and serve to prevent the collapse of the film holder. Suitable openings are drilled through the various ribs to form connections for the passage of air between the various ribs. The interior of the hollow film holder is divided into a plurality of sub-divisions by suitable flat metal strips, such as 23, which form a division in the center of the face plate, 18, so as to accommodate the smallest size of the film that is adapted to be employed with the particular camera. Another set of four metal strips, 24, serve to form another rectangular shaped receptacle integral with the film holder, 17. Obviously, any number of these divisions may be made to accommodate all the different sizes of films that it is desired to employ in the camera. These films are of standard size and their dimensions are well known. The divided film holder is suitably attached by means of bolts, 27, within a recess, 28, in the door, 29, of the camera, which is suitably hinged for swinging movement along one side thereof by the hinges, 30, attached to the back of the camera, 39. The various divisions of the film holder are connected by outlet pipes, 32, to the vacuum line, 33. Valves, 34, of any suitable construction divide each of the connections, 32, from each other; thus, it will be seen that when the first valve, 34, is opened with the remaining valves closed, the air is exhausted from the inner chamber of the film holder, defined by the metal strips, 23. When the next valve, 34, is opened, both the inner chamber, defined by the strips 23, and the adjoining chamber, defined by the strips 24, are connected by the vacuum line, and the pressure of the air within these chambers is reduced by the vacuum pump; thus, it will be seen that the area of the space of the face plate, 18, to which the vacuum is applied, can very easily be defined. The face plate, 18, is provided with a plurality of small, equally spaced openings, 35, which penetrate into the various chambers of the film holder, defined by the metal strips, 23 and 24.

When it is desired to use the cameras, the vacuum pump connected to the outlet, 33, is started into operation and one or more valves, such as 34, are opened so that the proper number of divisions of the film holder, having an area equal in size to the area of the film to be employed, are opened. The film is then adjusted so as to coincide with the area, and the air pressure serves to hold the film tightly against the face plate, 18, free from any curls. As soon as the air pressure places the film against the face of the plate, 18, the film lies in a perfect plane and serves somewhat to seal the openings, 35. It is possible therefore, to slow down the action of the vacuum pump by a valve or by reducing its speed, since it is required to exhaust a lesser amount of air than is the case when the film is not held tightly against the face of the plate, 18, covering the openings, 35. It will be appreciated that the strength of the vacuum pump may be regulated in accordance with the size of the film so that the film will be held tightly in a perfect plane but will not be under sufficient pressure to cause it to become marked with the impression of the openings, 35.

It will be obvious that it is essential to divide the hollow compartment of the film holder, 17, into sections, in order that various sized films may be employed, since if it were attempted to exhaust the whole interior of the film holder without such sectionalizing, when a small film was placed on the surface of it, a very large capacity vacuum pump would have to be employed in order to maintain sufficient air pressure on the film to hold it in position. By the use of this sectionalizing, it is possible to employ a small capacity vacuum pump and at the same time secure maximum holding of the film. The film may be released by pulling along one edge thereof, or by operating a valve to cut off the vacuum or stopping the vacuum pump.

It will be obvious also, that where it is undesirable to fit the camera with a sectionalized film holder as described in Figs. 4 to 6, inclusive, a number of film holders of different sizes of the type described in Figs. 1 and 2 will be employed in conjunction with the usual camera plate holder to accommodate the various sizes of the films which it is necessary to employ.

It is to be pointed out that the ability to reduce the drain on the vacuum pump, after the film is in place, is of material merit since it reduces the wear on the pump.

From the foregoing, it will be seen that my improved film holder makes it possible to employ films for photographic work heretofore requiring plates with at least as good, if not better results. My novel film holder not only holds the film in a perfect plane, preventing its bulging or curling, but holds the film so perfectly that it is not subject to vibration. This permits films to be employed for color photography, half-tone, photogravure and copy work, with a nicety of results heretofore unobtainable. It will be obvious that any vibration communicated to the camera will cause movement of the camera as a whole if of sufficient intensity, but the film is so firmly held that it will be moved in conjunction with it if at all so that the film will have the same relative position at all times, with respect to the camera.

While I have shown and described my improved holder in connection with holding films, it will be obvious that it may be employed to hold copy work in the form of a copy board. In this adaptation of my invention, a copy board may be constructed in identically the same manner as the film holder shown in Figs. 1 or 2, or in Figs. 4 to 6, inclusive. Obviously, when the copy is laid on the face plate, 9, or 18 of the holder, the air pressure will serve to force the copy against the face plate in a perfect plane and will hold the copies in such perfect plane. In fact, by the use of air pressure in this manner, it is possible to hold the copy a great deal better than heretofore where pins and clips have been employed. This follows because by the use of pins or clips, a relatively small number of contacts can be secured, while by the use of air pressure, applied to the whole face of the copy, it will be flattened out and caused to lie parallel to the plane of the face plates, 9, or 18, thus eliminating all tendencies to curl or bulge, and permits a more clear and distinct copy to be secured than has heretofore been possible. The use of air pressure in a copy board of this kind also eliminates the use of glass, which is sometimes necessary to maintain the copy in a plane and prevents its bulging, and elimination of the glass enables better photographic results to be obtained in a shorter time, since glass always affects the light passing through it to some extent.

This principle of air pressure holding, may be also applied to printing frames with gratifying results. In this use or application, the printing frame may be constructed in a manner similar to the film holder illustrated in Figs. 1 and 2. As explained before, it is desirable that the film be somewhat larger than the printing paper. The printing paper is first placed on the holder and the air pressure places it against the face, 9, thereof so that it lies perfectly flat. The film is then placed over this and projects over the edge of the printing paper, and is held up against the paper by the air pressure along the edges. If desired, a border mask may be placed over the film. The printing frame is then exposed to light in the usual manner. Since the glass heretofore used has been eliminated, improved photographic effects may be secured in a shorter time, since the light rays are not changed in any manner. It is also possible, in the use of this printing frame, to place various transparent or translucent materials over the face of the film to secure any desired effects of softening or otherwise, since the material being of larger area than the film, will be held flat against the film by air pressure along the projected edges in the same manner as the film is held, as explained hereinbefore.

From the foregoing it will be seen that it is possible to apply my invention in various ways in photographic art to secure improved novel and unique results. Obviously, this method of employing air pressure in the photographic art is highly beneficial, since apparatus of a relatively simple character and cheap construction may be employed to secure the results described.

While I have described my improved method of holding the photographic materials, and several applications thereof, it will be understood that many changes, modifications and deviations may be made without departing from the spirit and scope thereof, as defined by the appended claims.

I claim:

1. In a film holder adapted to be used as a substitute for the usual photographic plate comprising a metallic plate having a multiplicity of small spaced apart openings therethrough in the form of a rectangle, means including said plate for forming a flat box like enclosure, and for dividing said enclosure into a plurality of sections, each distinct from the other and defining an area adapted to receive and hold a film of such size that the film's peripheral edges extend beyond said area and a vacuum connection extending into the interior of each section.

2. A film holder adapted to hold a film in position to be used as a substitute for the usual photographic plate comprising a flat box-like enclosure of substantially the same shape as a photographic plate having a multiplicity of closely spaced apart openings along one face thereof defining an area adapted to receive a film with the peripheral edges of the film extending beyond said area, and a vacuum connection extending into the interior of said enclosure.

3. A film holder adapted to hold a film in position to be used as a substitute for the usual photographic plate comprising a flat box-like enclosure of substantially the same shape as a photographic plate having a multiplicity of closely spaced apart openings along one face thereof defining an area shaped so as to receive and hold a film in such position that its edges extend beyond said area and a vacuum connection extending into the interior of said enclosure.

4. A film holder adapted to hold a film in position to be used as a substitute for the usual photographic plate comprising a flat box-like enclosure of substantially the same shape as a photographic plate having a multiplicity of closely spaced apart openings along one face thereof defining an area adapted to receive a film with the peripheral edges of the film extending beyond said area, and a vacuum connection extending into the interior of said enclosure, and resilient means cooperating with said enclosure adapted to hold a film in position in said area.

HOWARD B. DILKES.